March 17, 1953 J. A. SARGROVE 2,631,565
METALIZING APPARATUS

Filed Feb. 25, 1948 9 Sheets-Sheet 1

Inventor:
John Adolph Sargrove,
By:
Pierce, Scheffler & Parker,
Attorneys.

March 17, 1953    J. A. SARGROVE    2,631,565
METALIZING APPARATUS
Filed Feb. 25, 1948    9 Sheets-Sheet 2
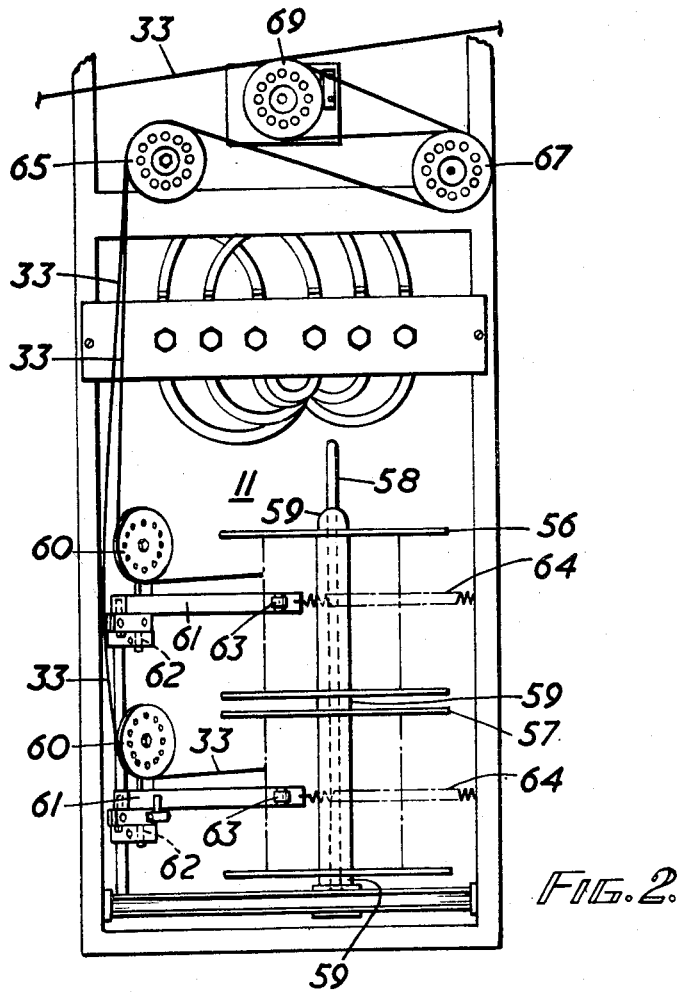
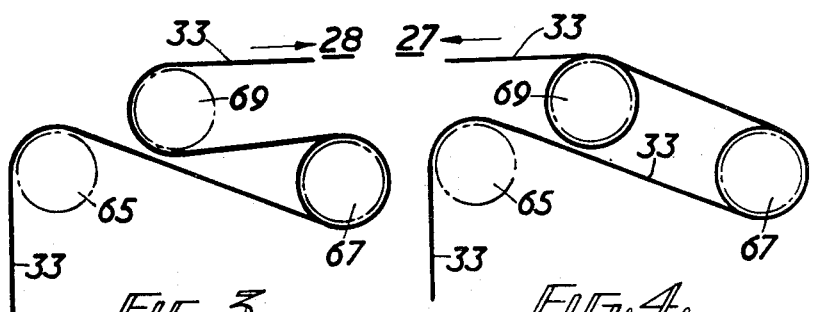
Inventor:
John Adolph Sargrove,
By:
Pierce, Scheffler & Parker,
Attorneys.

March 17, 1953  J. A. SARGROVE  2,631,565
METALIZING APPARATUS
Filed Feb. 25, 1948  9 Sheets-Sheet 3

Inventor:
John Adolph Sargrove,
By:
Pierce, Scheffler & Parker,
Attorneys.

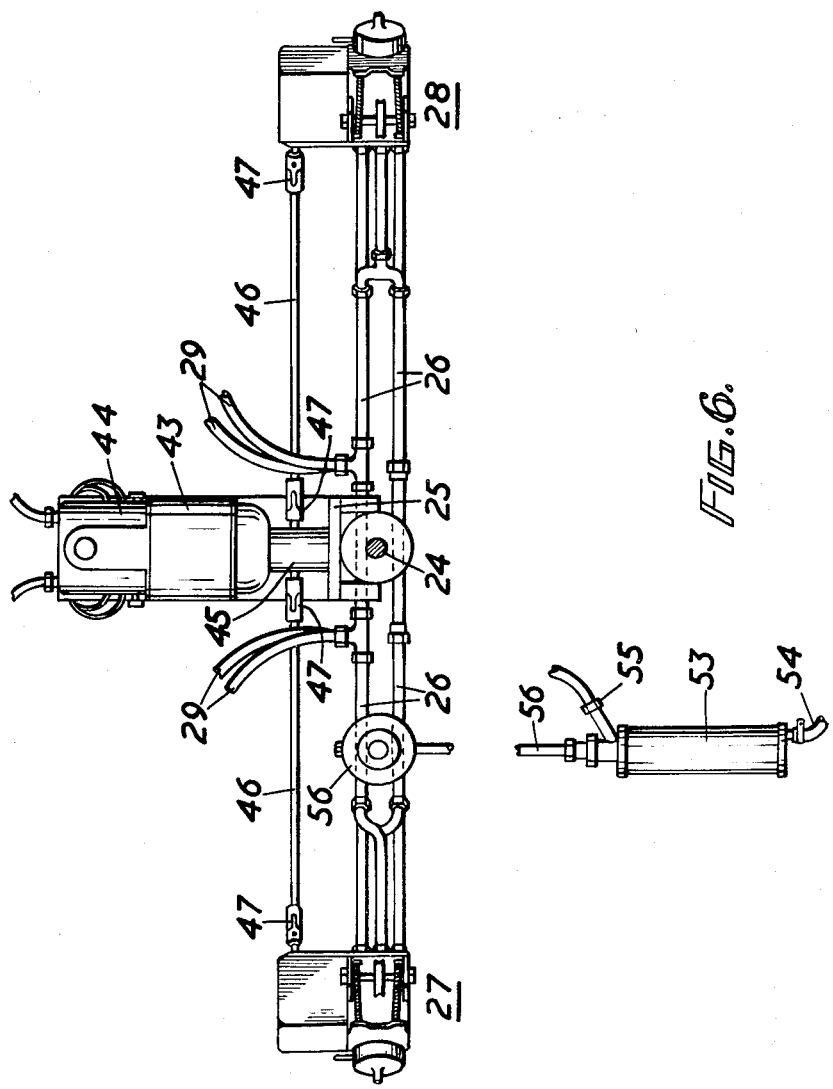

March 17, 1953 J. A. SARGROVE 2,631,565
METALIZING APPARATUS
Filed Feb. 25, 1948 9 Sheets-Sheet 5

Inventor:
John Adolph Sargrove,
By:
Pierce, Scheffler & Parker
Attorneys.

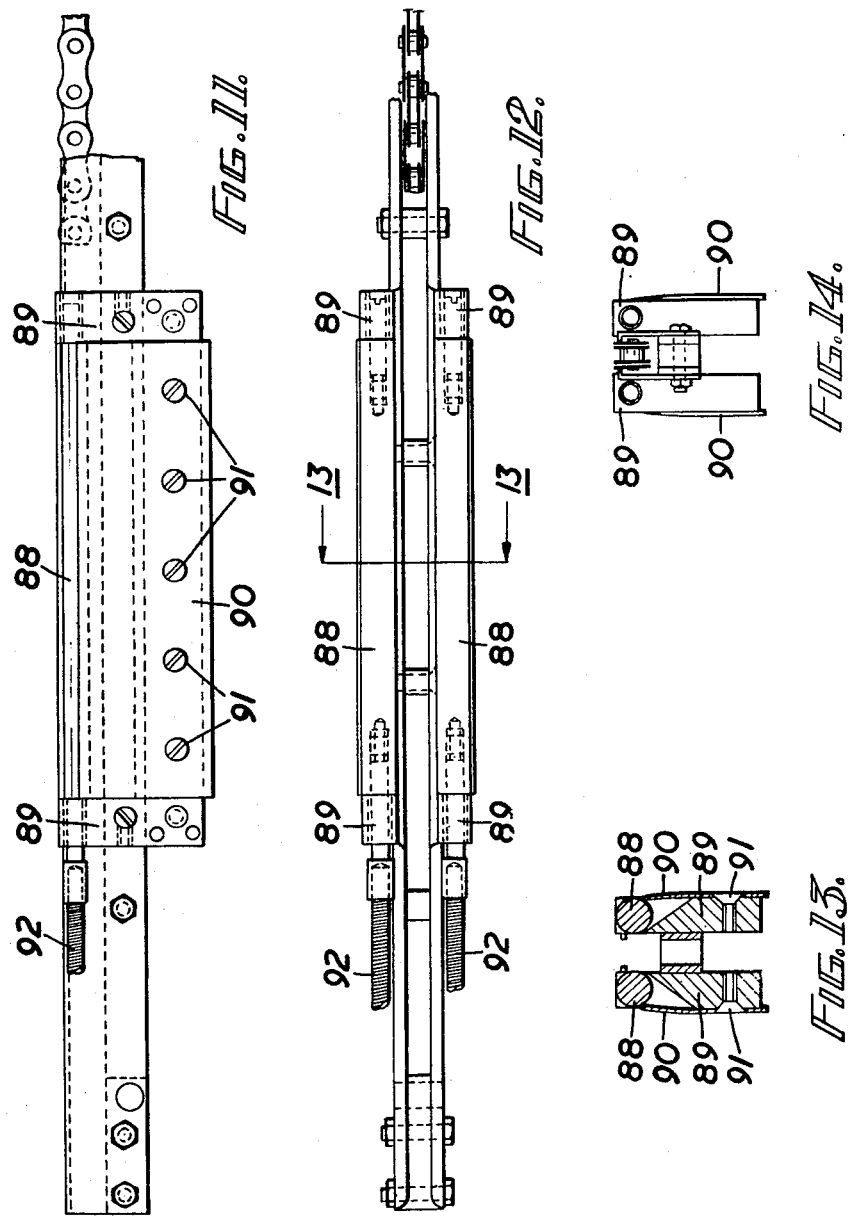

March 17, 1953 J. A. SARGROVE 2,631,565
METALIZING APPARATUS
Filed Feb. 25, 1948 9 Sheets-Sheet 7

Inventor:
John Adolph Sargrove,
By:
Pierce, Scheffler & Parker,
Attorneys.

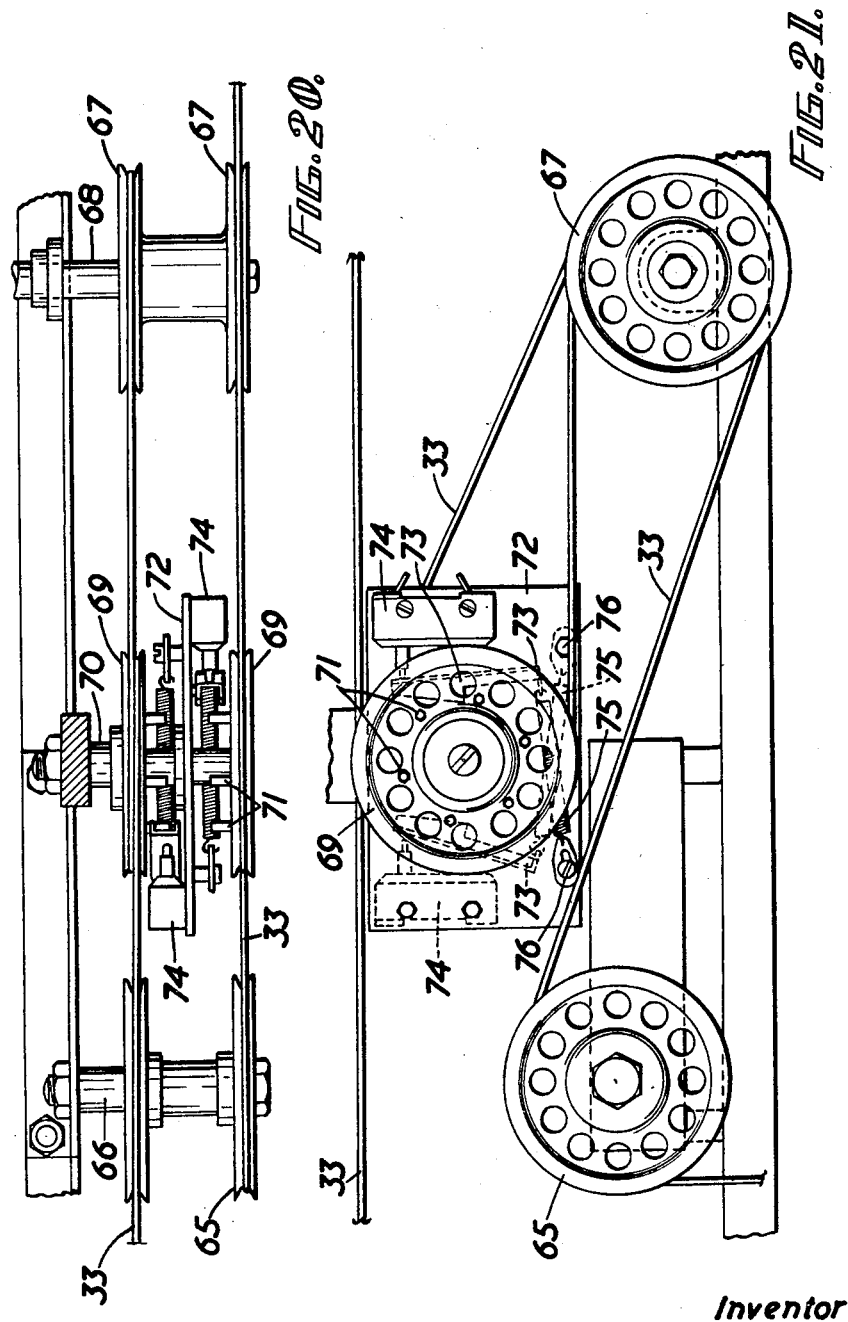

Patented Mar. 17, 1953

2,631,565

UNITED STATES PATENT OFFICE 2,631,565

METALIZING APPARATUS

John Adolph Sargrove, Middlesex, England, assignor of one-half to Sargrove Electronics Limited, Middlesex, England, a British company Application February 25, 1948, Serial No. 10,702
In Great Britain February 19, 1947

Section 1, Public Law 690, August 8, 1946
Patent expires February 19, 1967

2 Claims. (Cl. 118—316)

This invention relates to metallising and apparatus for the coating of articles by means of a projected stream of molten particles. The invention has for its main object the provision of means by which a metallising process may be carried out under automatic control and with a minimum of human supervision.

In my co-pending U. S. patent application Ser. No. 549,770, filed August 16, 1944, now Patent No. 2,474,988 there is described a method of manufacturing radio receivers and other light current electrical apparatus by moulding panels or plates of insulating material, and coating the plates with a layer of a conductor so as to fill depressions formed in the plates, thereby to form components and the conductors leading thereto.

In the production of apparatus by this process it is important that the plates should be evenly coated and the present invention has for its main object the provision of an improved arrangement for securing such an even coating.

According to a feature of the present invention, the article to be treated is moved continuously and substantially uniformly past a coating station and the device for producing the spray of molten metal is oscillated in a direction across the line of travel of the article.

When a substantial coating of material is to be applied to the surface of a plate it is found that the continued subjection of the plate to the metallising spray causes an asymmetrical heating of the plate. Further, this in itself would not be a serious difficulty, but as the deposited metal cools and contracts it induces warping of the plate. If as is the case with the process described in my above noted co-pending application, the plate is subsequently to be faced by a surface-milling machine, this warping is a grave disadvantage and its avoidance is most desirable.

According to another feature of the present invention, therefore, where both sides of a plate are to be coated the moving spray-producing devices are arranged on opposite sides of the article to be coated, since the heating is thereby balanced, and it is found that warping is substantially eliminated.

With this opposed arrangement of the spray-producing devices it is convenient to balance the moving weights of one against the other, or of a pair in one metallising station against a pair in another station further along the conveyor.

In the accompanying drawings is shown by way of example one embodiment of the present invention. In these drawings:

Figure 2 is an elevation of the lower part of the cubicle the upper portion of which is shown in Figure 1;

Figures 3 and 4 are diagrams indicating the paths of the wires to the two guns;

Figure 6 is an elevation of one of the spraying assemblies of Figure 5;

Figures 11 and 12 are respectively a fragmentary elevation and plan of a chain conveyor protector;

Figure 13 is a section on the line 13—13 of Figure 12;

Figure 14 is an end view of the conveyor of Figure 12;

Figure 20 is a plan view of the wire feed and guide pulleys;

Figure 21 is a front elevational view of the arrangement of Figure 20;

The apparatus which is shown in these drawings forms part of a complete fully automatic apparatus for the production of electrical apparatus made in accordance with the process described in my above noted copending application, and in this complete machine moulded panels of insulating material are successively shotblasted to remove surface polish, sprayed with molten metal, face-milled to remove surplus metal, sprayed with electrical resistance deposit through stencils, aged and lacquered. The resulting panels are electrical units, the nature of which is determined by the original configurations of the panel and the fashion of the resistance deposit, which are complete but for the insertion of units such as valves, large condensers or loudspeakers. The complete machine is fully automatic in that the successive stages are initiated and operated by the presentation of a panel to be treated, and will be stopped if the processing is defective, or if the supply of panels ceases. In the event of a defect arising in one stage succeeding stages will be permitted to continue operation, but preceding stages will be stopped.

The apparatus which is the subject of the present invention constitutes the metal-spraying stage of the complete machine.

In my co-pending U. S. Application Ser. No. 8042, filed February 13, 1948, now Patent No. 2,570,600 there is described in some detail the electrical circuit means by which a metallising stage according to the present invention can be automatically controlled. That specification also refers to certain considerations which apply not only to the design of the electrical circuit of the apparatus but also to the mechanical arrangement with which the present invention is more particularly concerned; attention is accordingly directed to that specification for a more detailed description of the sequence of operation of the apparatus.

Briefly, however, the sequence of operation of the apparatus is that when a panel arrives from a preceding stage of the machine an exhaust man is started to exhaust air from an inner spraying cubicle; a readily ignitible gas such as town gas is supplied to a pilot burner and is ignited by means of a sparking plug; in sequence, fuel gas, oxygen and compressed air are supplied to the spraying nozzle; the wire is fed to the nozzle and the nozzle is oscillated by a linear movement, air operated device. The apparatus is stopped: if a solid wire is fed, unmelted, from the nozzle or if the wire feed falls below a predetermined rate. The apparatus will stop in any case if further panels are not presented to it within a predetermined period.

The complete machine is constructed as a series of cubicles through which extends a conveyor line for the panels to be processed, the conveyor having separate sections of different character and separately controllable.

Figure 1:
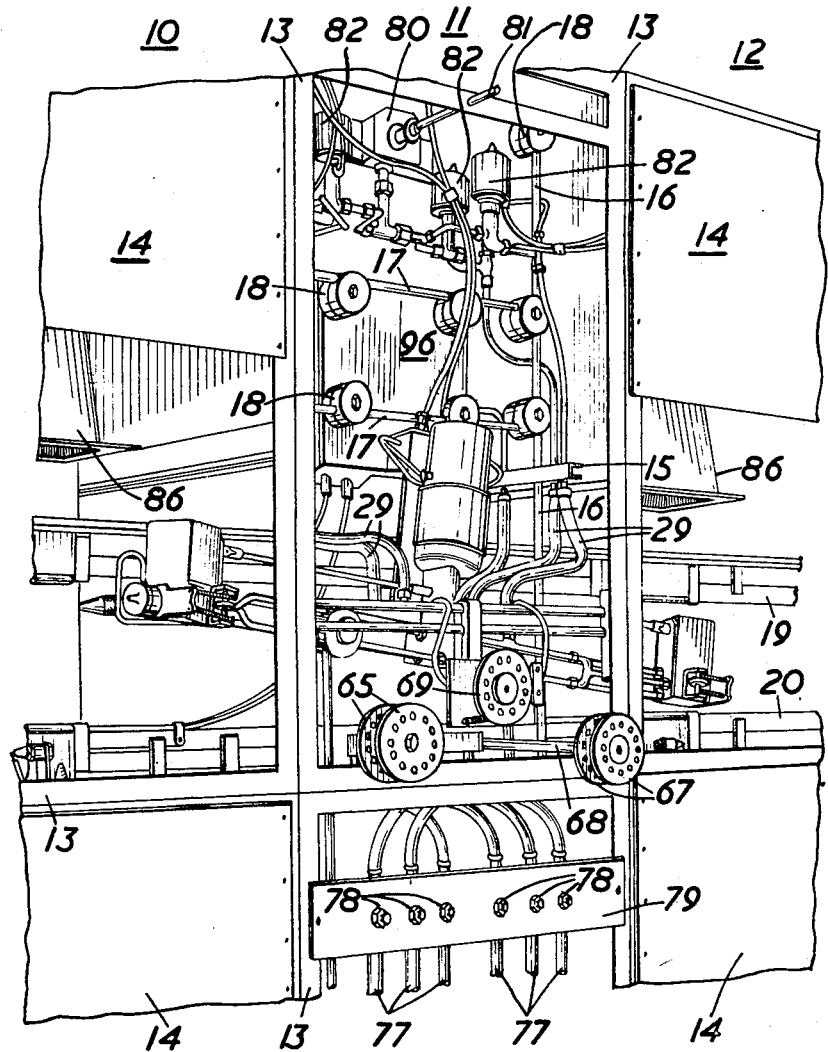
Figure 1 is a perspective view of part of the complete machine showing two spraying positions and the apparatus which is employed for driving and feeding the spray guns.

The metallising stage occupies three such cubicles, which are indicated at 10, 11 and 12 in Fig. 1. The central cubicle 11 is the one in which the main control and driving mechanism is housed whilst the spraying proper takes place in cubicles 10 and 12. Each cubicle consists of a rectangular frame 13 of angle section steel, covered wherever possible by metal panels 14. Within each cubicle a readily adaptable and adjustable mounting means is adopted for the individual parts of the apparatus, comprising channel members such as 15 which are suitably supported by the main cubicle framework, these channel members are drilled with a series of holes to receive vertical supporting rods such as 16, and these vertical rods in turn support further rods 17. Connection between rods 16 and 17 and other parts is effected by clamping discs 18 having grooves in the surface of the discs to engage the rods, and having a central hole to receive a bolt.

Figure 15:
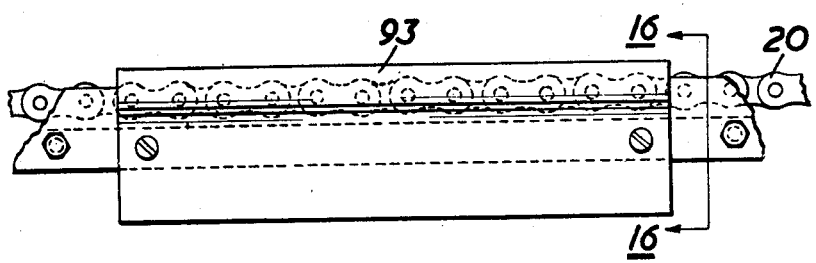
Figure 15 is an elevation of an alternative form of chain conveyor protector.

Extending centrally through the cubicles is a conveyor line consisting of upper and lower conveyor chains 19 and 20, a fragment of which is shown in Figure 15. The chains run between guides, and are adapted to support between them panels to be processed, as indicated at 21 in Figures 21 and 22. The conveyor is driven by an electric motor, not shown.

Figure 5:
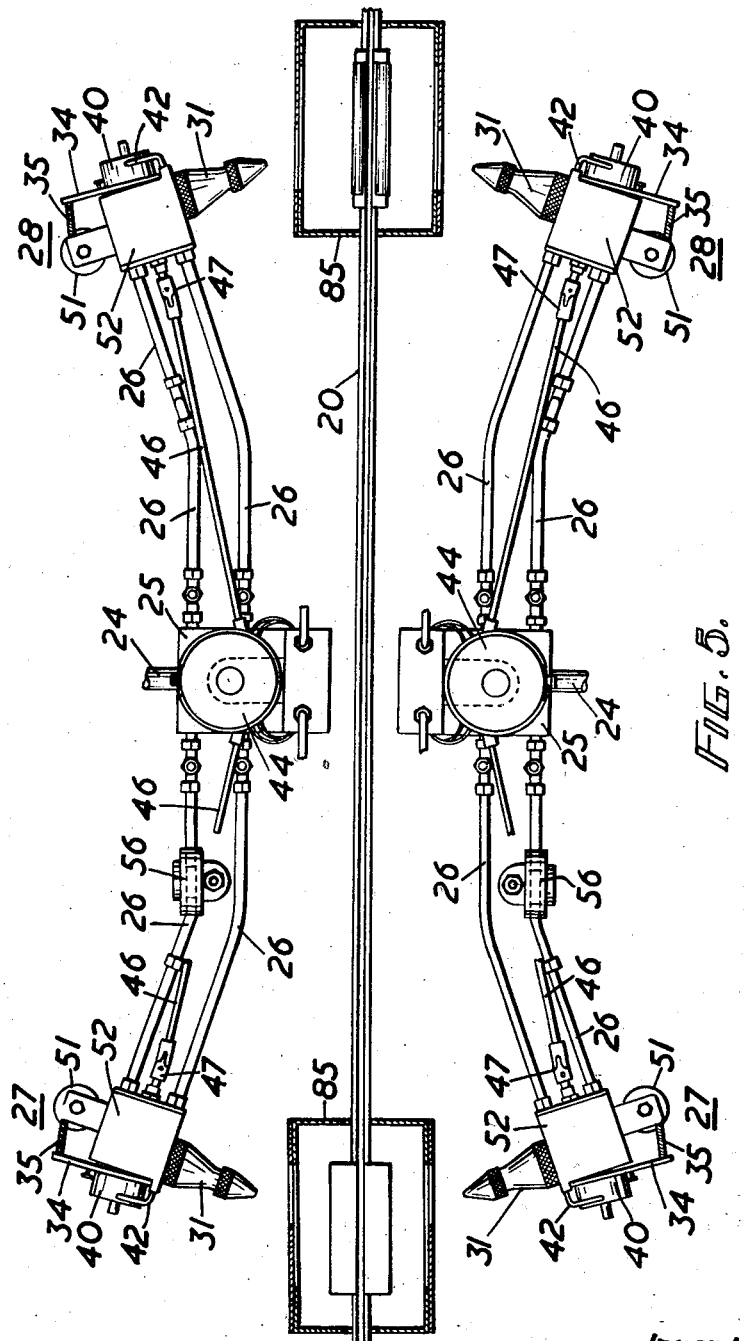
Figure 5 is a plan view of the two opposed, rocking, spraying assemblies.
Figure 10:
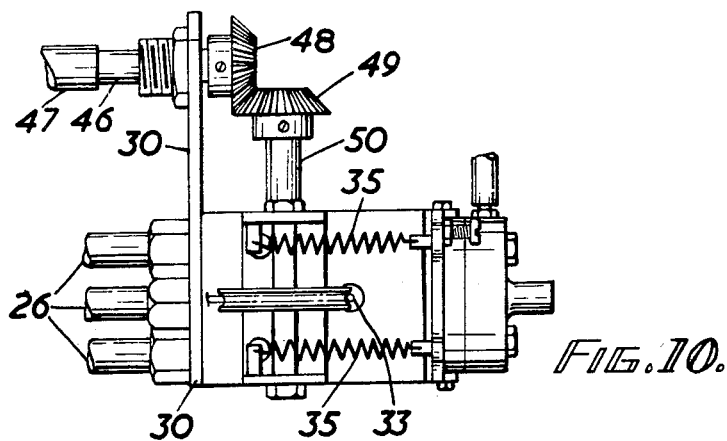
Figure 10 is a front view of the nozzle of Figure 7 looking from the right hand side of Figure 7.
Figure 7:
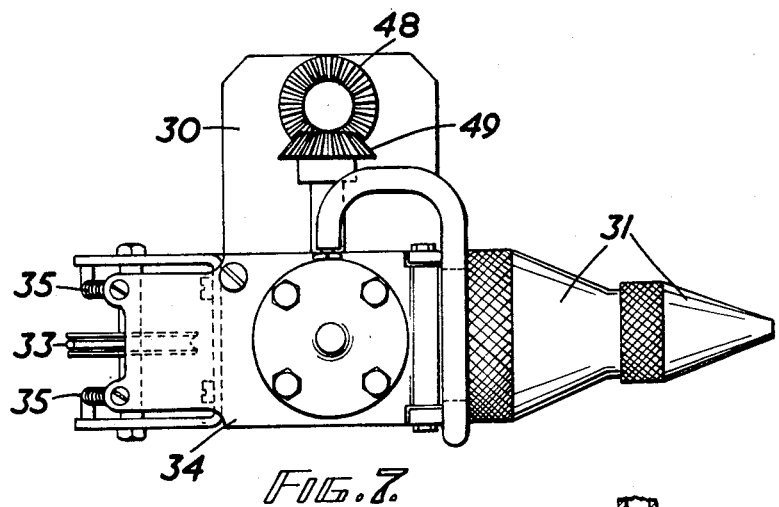
Figure 7 is a side view of one of the spraying nozzles.
Figure 9:
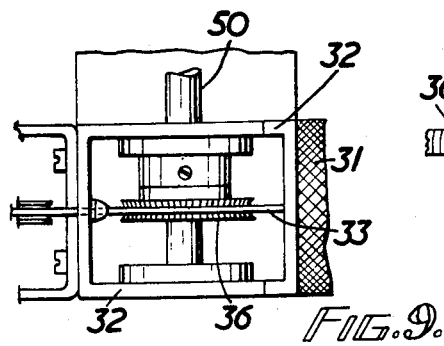
Figure 9 is an end view of the nozzle of Figure 7 with the spring pressure plate removed to show the wire feed rollers.
Figure 8:
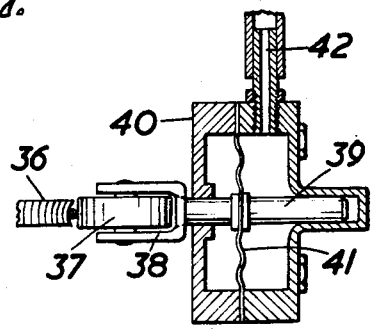
Figure 8 is a section through the nozzle of Figure 7 showing more particularly the pressure-operated wire feed device.

Mounted one on each side of this conveyor are two metallising gun assemblies indicated generally at 22 and 23 in Figure 5. These assemblies are similar and are each arranged to rock about a central supporting shaft 24, and each includes a base plate 25 from which extend outwardly in both directions a number of rods and tubes 26; these rods and tubes support spraying nozzles 27 and 28. Those of the members 26 which are tubes are also used to convey to the nozzles the gases necessary for the production of the flame to melt the metal to be sprayed and for producing the requisite velocity of projection of the molten particles. The gases are fed to tubes 26 through flexible connections 29 near the inner ends of the tubes; the supplies to the various nozzles are individually controllable.

The construction of one of the nozzles is shown in Figures 7 to 10, and comprises a plate 30 to which the ends of the tubes or rods 26 are secured, and which also carries the nozzle proper 31 to which the gases are fed. The nozzle proper 31 is backed by a box-like casing 32 which contains a feeding means for a wire 33 of the metal which is to be sprayed, and which is closed by a hinged cover 34 loaded by springs 35 to the closed position.

Journalled in the casing 32 is a wire feed roller 36, which is continuously driven, and over the periphery of which the wire 33 is passed; the pressure necessary to hold the wire against the roller 36 is applied by means of a backing roller 37. For reasons referred to hereinafter, however, it is most desirable that the backing roller should not be applied to the drive roller 36 to effect wire feed until air pressure is applied to the nozzle, and the backing roller is therefore arranged to be under control of the air pressure applied to the nozzle. With this object the roller 37 is carried in a yoke 38 mounted upon an axially movable but non-rotatable shaft 39 mounted in a box 40 containing a diaphragm 41, one side of which is connected to the air supply for the nozzle through an opening and suitable connection 42. Thus when air is applied to the nozzle the roller 37 is advanced to press the wire against the rotating roller 36, and the wire is accordingly fed. In practice, there is considerable pressure applied to the diaphragm, which is greater than the pressure required on the wire, and it therefore is preferred to arrange for the movement of the shaft 39 to be limited by a stop when advanced under air pressure; the pressure on the wire is then determined only by springs 35 and can be easily adjusted without reference to the air pressure on the diaphragm.

The rotation of the feed roller 36 is effected by an electric motor 43 which is mounted upon and moves with the base plate 25. This motor has a speed control governor 44, and through a reduction drive 45 drives the shafts 46, universal joints being included at 47. At their outer edges, each shaft 46 carries a bevel wheel 48 engaging a similar wheel 49 which is mounted upon the shaft 50 of the drive roller 36. A guide pulley 51 is provided to feed the wire 33 into the pinch of the rollers 36 and 37, and a cover 52 is provided for the bevel wheels 48 and 49; in Figures 7 to 10 this cover 52 is removed.

As is pointed out in my aforesaid application No. 8042, it is desirable that the spraying assemblies should be oscillated so that the movement of the nozzles is substantially linear with time, i. e. at a uniform rate; a movement, such as an eccentric drive, which results in a simple harmonic motion of the nozzles results in an uneven coating of the panels. Figure 6 shows a suitable form of driving means comprising a double acting air cylinder to ends of which compressed air can be admitted through connections 54, 55 to cause substantially linear movement of the connecting rod 56. The connecting rod is pivotally coupled to a suitable point on the spraying assembly at 56. A cylinder such as 53 is provided for each assembly. As described in application No. 8042 the admission of air to one or other of the connections 54 or 55 is effected by means of electromagnetically operated valves under the control of electric limit switches (not shown) operated by the spraying assembly in its travel.

The wire which is to be melted is stored upon drums 56, 57, one for each of the two spraying nozzles, which are mounted on a vertical supporting shaft 58 in the lower part of the cubicle 11. If, as is usually the case the drums 56 or 57 are of metal, the drums are insulated from the body of the cubicle by insulating sleeves and/or washers as at 59. The wire as it is drawn from each drum passes over one of two guide pulleys 60; these pulleys are mounted upon arms 61 pivoted in an insulating manner on the main frame at 62. Each arm 61 at its inner end is provided with a roller 63 which is adapted to engage the surface of the wire upon the corresponding drum and is there held by a spring 64. In this way each pulley 60 is arranged to lie in a plane tangential to the surface of the wire upon the drum, so that the tendency of the wire to jump from the pulley groove is substantially eliminated. Rollers 63 also act as damping pads to reduce over-run of the drums when the spraying process is stopped.

From the pulleys 60 the wires pass each over one of two pulleys 65 carried upon a shaft 66 mounted on the frame of the cubicle and thence over one of two pulleys 67 upon a shaft 68, also carried on the cubicle frame, and over one of two pulleys 69 mounted on a shaft 70. The directions of the two wires differ slightly as is shown in Figures 3 and 4. Of these various pulleys pulleys 65 and 69 are free upon their respective shafts; pulleys 67 are fast upon the shaft 70 which, as described hereinafter, is driven from an electric motor.

Pulleys 67 are in the nature of capstan or servo pulleys, and while taking the major part of the load in drawing the wire from the drums 56 or 57, are subject to the control of the wire feed by the roller 37. The wires 33 from the two drums are passed a complete turn round the respective pulley 67, but so long as there is no tension upon the wire from the direction of the pulley 69, the wire merely slips on the periphery of the pulley 67. As soon as compressed air is applied to the diaphragm 41 however, and the resulting movement of roller 37 causes the wire to be fed, tension is applied to the wire as it winds off the driven pulley 67. In the manner of a conventional capstan, the pulley 67 then grips the wire and assists in drawing the wire from the drum.

For the purposes of control as set out in copending application No. 8042, the wires which are fed to the nozzles are required to be insulated from the frame of the apparatus. The various pulleys 65, 67 and 69 are therefore all arranged with insulating sleeves inserted between the pulleys and their shafts, or equivalent means are adopted to prevent the wires being connected to the frame in their passage from the drums to the nozzles.

For the successful operation of the machine the speed of consumption of wire must be monitored, and a convenient method of doing this is to arrange for one of the feed pulleys such as 65 or 69 periodically to actuate a pair of contacts, and to provide an electrical circuit which responds to the periodic closing of the contacts. It may be observed that such contacts cannot be associated with the pulleys 67, since these pulleys are continuously driven, and their speed is not an indication of the speed of movement of the wire.

Suitable contacts for this purpose are shown in Figures 20 and 21 associated with pulleys 69. On the inner faces of these two pulleys are secured a series of pins or pegs projecting inwardly towards a central stationary plate 72; this plate carries two channel section levers 73, pivoted at approximately their mid points to the plate 72. The plate 72 also supports two switches 74, so-called "micro-switches," and as the pulleys 69 rotate the pins 71 rock the levers 73; and thereby cause periodic operation of the switches 74. The levers are loaded by suitable helical restoring springs 75 extending between the lower ends of the levers and anchor joints 76 on the plate 72. The micro-switches 74 are so arranged with respect to the levers 73 as to be operated only by the overthrow of the levers when released from the pins 71; in this way the switches are not actuated by the levers when the pulleys are at rest, whatever may be the position of the pulleys.

The fuel and other gases to the nozzles are fed under the control of a series of electromagnetically operated and other valves indicated in Figure 1. The gas supplies to the guns are coupled to inlets 77, with a separate hand-operated cock 78 for each gas to each nozzle; the cocks 78 are carried upon a plate 79 secured to the main framework of the cubicle 11. Cocks 78 are used to control the gas supplies only during setting-up or maintenance operations. The inlets 77 are all connected through suitable connections to a main cock 80 at the top of cubicle 11; the operating spindle of this cock extends to the outer face of the cubicle and is adapted to receive an operating lever by which all gas supplies to the nozzles can be readily cut off by hand.

From the cock 80 the gas supplies are fed to the electromagnetically operated valves 82, one for each gas to each nozzle, though the supplies to the opposed nozzles at the same station can be controlled by common means if desired. By the electrical control means described in the co-pending application No. 8042, such valves are operated in correct sequence for ignition and maintenance of the metallising flames. The flames are started by means of a pilot jet 83, one for each nozzle, to which town gas or the like is supplied at an appropriate moment, and a sparking plug 84. In this way a pilot flame is produced from which the main flames are ignited; when this has been done the pilot flame is extinguished.

When the metallising process has been correctly started the panels are simultaneously sprayed from both sides, as is shown in Figure 5. This has the advantage that the panels are subjected to approximately equal heating and are therefore less likely to warp than if each side were separately sprayed. It is not advisable however to deposit in one operation all the metal upon the panel, and it is for this reason that successive metallising stations are employed. In practice it is found most satisfactory to deposit the metal in four stages; three complete units, providing six spraying stations have been very satisfactory, with means for automatically operating two of three units, and for switching to the third unit automatically if either of the two stages should fail to operate correctly.

When the stages are operating correctly it is possible to reduce the ambient temperature in the immediate vicinity of the panels by forced air draught. In addition, even when correctly operating there is appreciable spill of the metal spray from the nozzles which tends to accumulate upon the machine. According to one feature of the invention a single means is provided for producing this forced draught and for preventing excessive metal deposit upon the apparatus.

Figures 22, 23:
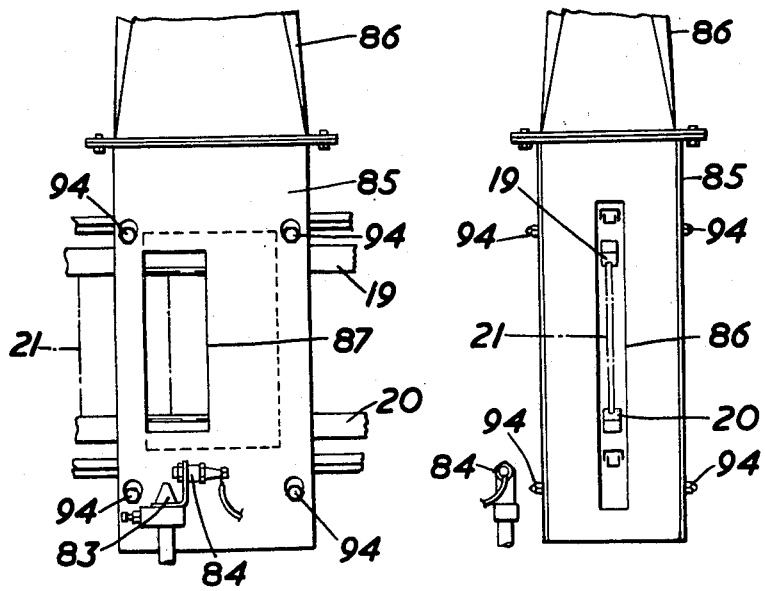
Figure 22 is a front elevational view of the inner spraying cubicle.
Figure 23 is a side view of the arrangement of Figure 22.

This means comprises for each spraying station an inner cubicle 85, shown in Figures 5, 22 and 23 (the cubicle is omitted in Figure 1) which at its upper end is attached to a hood 86 by which connection is made to a high capacity exhaust system. The cubicles 85 surround the conveyor system 19 and 20, and the panels are admitted to the cubicles through narrow slots 86a in the ends thereof. The sprayed metal from the nozzles is projected through slots 87 in the sides of the cubicles. In this way there is a considerable flow of cooling air over the panels and in addition the air carries away with it a large proportion of the metal spray which is not directed on to the panels. This metal is recovered by a suitable separator in the air system.

Despite these precautions some metal is still deposited in positions where it is not wanted: some tends to deposit upon the conveyor and some upon the edges of the slot 87 in the inner cubicle side wall. Means are therefore provided to protect the conveyor; such means are shown in Figures 11, 12, 13 and 14, and an alternative form in Figures 15 and 16. It is to be observed that a simple flat shield is not suitable for protecting the conveyor as the metal would continue to deposit upon it; eventually the deposit would interfere with the spray and prevent it reaching the panel.

The arrangement shown in Figures 11 to 14 comprises two highly polished metal rollers 88 mounted for rotation in stationary bearing members 89 so as to lie closely against and parallel to the line of the lower conveyor chain 20. Also carried on members 89, and bearing against the surface of the rollers 88 are two scraper blades 90, secured by screws 91. The two scraper rollers are showed rotated against the blades 89 by flexible drives 92. The metal deposit does not adhere easily to the polished rollers and by suitable adjustment of blades 89, the deposit can be continuously stripped from the rollers.

Figure 16:
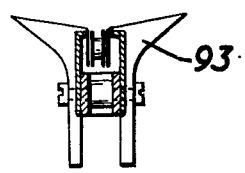
Figure 16 is a section on the line 16—16 of Figure 15.

The conveyor protector shown in Figure 16 is a static device which has been found to work fairly satisfactorily. With this arrangement there are used protecting plates 93 shaped as shown in Figure 16 to present to the spray sharply inclined surfaces, meeting in a sharp knife edge. The plates are again highly polished so that the sprays impinge upon the plates in conditions which are most unfavorable for the deposit of metal. Further, any deposit tends to be blown away from the surfaces, so that there is a self-cleaning action.

There is also likelihood of a small metallic deposit occurring on the edges of the slots 87 in the side walls of cubicles 85, and such walls therefore include metal facings attached by screws or bolts 94. These facings can then be readily replaced when desired. In passing it may be mentioned that in the event of the wire 33 being discharged unmelted from the nozzle it is with the cubicle 85 that the wire will usually contact. The cubicle is therefore electrically connected to the frame of the apparatus.

Figure 17:
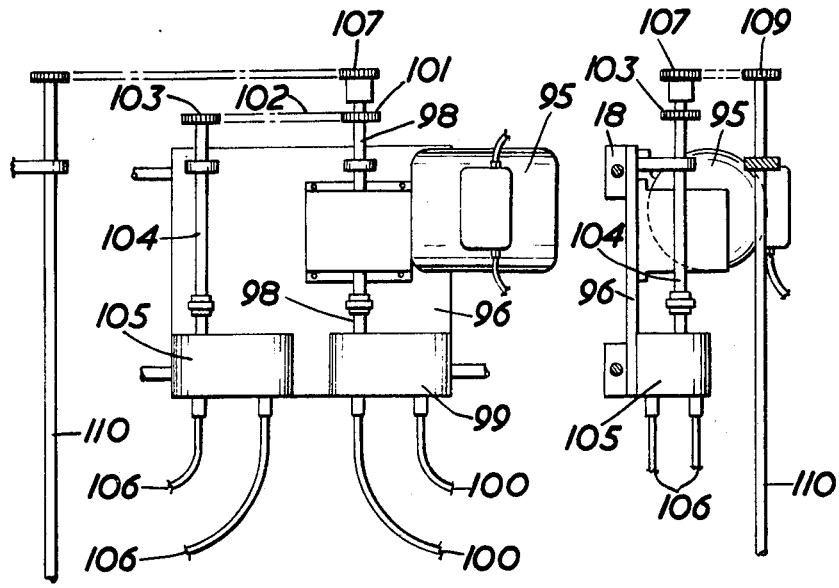
Figure 17 is a front elevational view of the driving means for actuating the chain cleaner of Figures 11 and 12, and for the wire capstan pulley.
Figure 18:
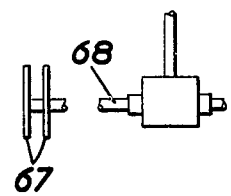
Figure 18 is a side elevational view of the parts of Figure 17.
Figure 19:
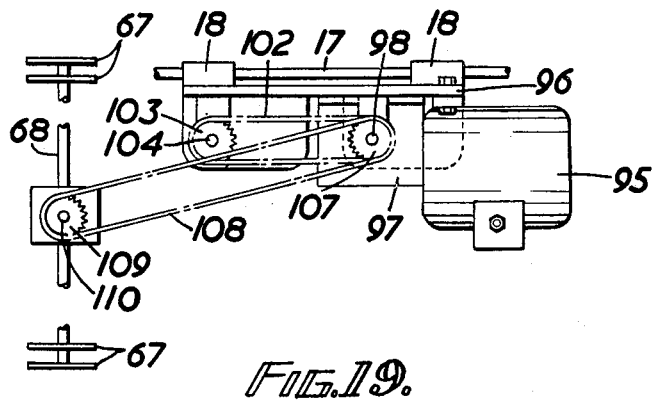
Figure 19 is a plan view of the arrangement of Figures 17 and 18.

The drive to the chain protector rollers 88 and to the capstan pulley 67 is effected from a single electric motor, the driving arrangements being shown in Figures 17, 18 and 19. This motor is indicated at 95, and is mounted on the rear side of a plate 96 of which the front side is visible in Figure 1. The motor is coupled to a reduction gear housing 97 which drives a slow speed shaft 98 projecting from both sides of the housing; at its one end this shaft is coupled to second gear box housing 99, which drives four flexible drive shafts 100 extending to the two upper and two lower flexible drives 92 at one of the metallising stations. The upper end of shaft 98 carries a sprocket 101 coupled by a drive chain 102 to a sprocket 103 on a shaft 104; shaft 104 is in turn coupled through a gear in housing 105 to a series of flexible shafts 106 which connect to the flexible drives 92 of another metallising station.

Shaft 98 also carries a second sprocket 107 which through chain 108 and sprocket 109 drives a vertical shaft 110; shaft 110 is coupled through a bevel gearing in housing 111 to the shaft 68 by which the capstan pulleys 67 are driven to provide the necessary wire feed.

With the apparatus described it has been found possible to obtain evenly coated metallised panels of good uniformity and adherence. The uniformity of the deposit is attributable to the fact that the vertical traverse of the spraying nozzles is effected linearly whilst the panel is moved uniformly past the nozzles. Uniformity is also due in part to the fact that as shown in Figure 5 the spraying nozzles at successive stations on the same side of the panels are directed at slight, opposite angles to the normal. In this way there is provided a satisfactory metal deposit upon the walls of the holes and recesses in the panels, and this also assists to some degree adherence of the deposit to the panel, though this is largely determined by the initial roughening process.

The nozzles which are opposite each other at the same spraying station are also arranged at a slight angle to each other; this prevents the sprays blanketing each other when they are operated, during maintenance or test periods, without a panel in position.

I claim:

1. A metallizing apparatus for the metallization of articles comprising a pair of spaced cubicles, a conveyor extending through openings in said cubicles provided in opposite walls of each cubicle and adapted to convey articles to be metallized through said cubicles in succession, a metallizing spray device disposed exteriorly of each cubicle to one side of said conveyor, said spray devices being carried at the opposite ends of a common support pivotally mounted intermediate its ends for oscillatory movement back and forth along a path transverse to the direction of movement of said conveyor, the wall of each cubicle adjacent the spray device associated therewith including an elongated slot disposed in the path of travel of the spray device, and means producing a flow of air through each cubicle.

2. A metallizing apparatus as defined in claim 1 and which further includes a second support pivotally mounted intermediate its ends for oscillatory movement back and forth along a path transverse to the direction of movement of said conveyor and a metallizing spray device at each end of said support, said second support and the spray devices carried thereby being disposed on the opposite side of said conveyor and adapted to spray through elongated slots provided in the wall of each cubicle adjacent the spray device whereby both sides of each article may be metallized simultaneously.

JOHN ADOLPH SARGROVE.

REFERENCES CITED

The following references are of record in the file of this patent:

UNITED STATES PATENTS

| Number | Name | Date |
|---|---|---|
| 1,952,760 | Lang | Mar. 27, 1934 |
| 1,956,220 | Johnson et al. | Apr. 24, 1934 |
| 1,968,815 | Boyden | Aug. 7, 1934 |
| 2,083,864 | Puckett | June 15, 1937 |
| 2,123,227 | Bieling | July 12, 1938 |
| 2,216,304 | Thornton | Oct. 1, 1940 |
| 2,227,752 | Ingham | Jan. 7, 1941 |
| 2,268,202 | Britton | Dec. 30, 1941 |
| 2,283,253 | Haven | May 19, 1942 |
| 2,317,173 | Bleakley | Apr. 20, 1943 |
| 2,383,023 | Sykes et al. | Aug. 21, 1945 |
| 2,400,315 | Paasche | May 14, 1946 |
| 2,434,176 | Potthoff | Jan. 6, 1948 |
| 2,445,451 | Padelford | July 20, 1948 |
| 2,486,251 | Braun | Oct. 25, 1949 |
| 2,505,179 | Gaythwaite | Apr. 25, 1950 |